(No Model.)

J. SPRATT.
OFFAL DRIER.

No. 318,050. Patented May 19, 1885.

Witnesses:
John Grist
R. P. King

Inventor:
Joseph Spratt
By Henry Grist
Atty.

UNITED STATES PATENT OFFICE.

JOSEPH SPRATT, OF VICTORIA, BRITISH COLUMBIA, CANADA.

OFFAL-DRIER.

SPECIFICATION forming part of Letters Patent No. 318,050, dated May 19, 1885.

Application filed September 8, 1884. (No model.)

*To all whom it may concern:*

Be it known that I, JOSEPH SPRATT, of Victoria, in the Province of British Columbia, in the Dominion of Canada, have invented certain new and useful Improvements in Offal-Driers; and I do hereby declare that the following is a full, clear, and exact description of the same, reference being had to the annexed drawings, forming part of this specification, in which drawings like letters indicate corresponding parts in all the figures.

Figure 1:
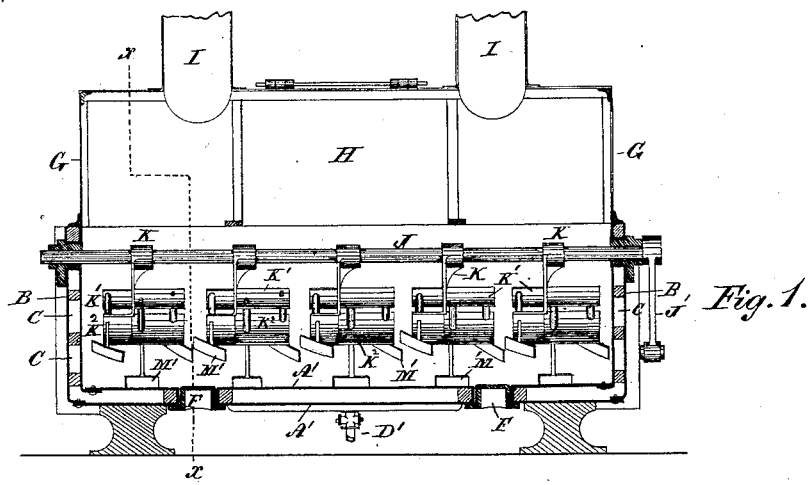
Figure 2:
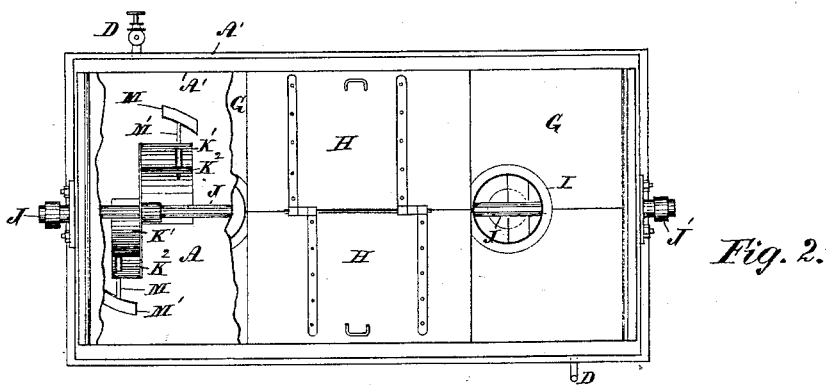
Figure 3:
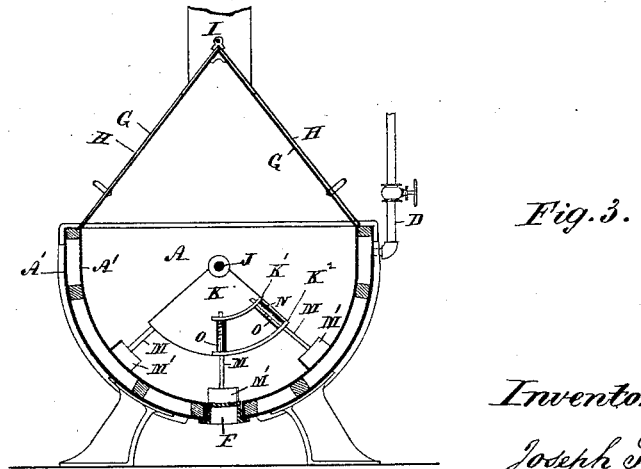

Figure 1 is a longitudinal sectional elevation of my improved drier. Fig. 2 is a plan of the same, a portion of the top being broken away to show the interior parts, and Fig. 3 is a transverse sectional view on the line $x\,x$, Fig. 1.

My invention has for its object to dry fish and other offal in an expeditious manner by means of hot air, hot water, or by steam injected between the double walls of a semi-cylindrical trough provided with beaters or stirrers oscillating therein on a longitudinal shaft, the moisture of evaporation passing off through flues in the cover of the trough.

My invention consists in the combination of a semi-cylindrical trough constructed of double walls and provided with inlet and outlet heating-pipes, a longitudinal rock-shaft journaled therein, provided with scraper or stirrer arms to distribute and pulverize the offal in the process of drying, and a cover fitting on the trough, provided with flues to carry off the moisture of evaporation.

A is a semi-cylindrical trough constructed of double walls A' A', subdivided by partitions B, forming channels C, to distribute and circulate steam, hot water, or other heating medium over the surface of the trough, which heating medium enters through pipe D and is discharged through pipe D' at the bottom of the trough.

F are capped openings in the bottom of the trough to remove the pulverized offal after being dried. On the top of the trough fits a gable-end cover, G, provided with doors H H to feed the trough with offal, and flues I I to carry off moisture of evaporation.

J is a shaft journaled in the trough longitudinally, and rocked by an arm, J', outside the end of the trough. The shaft J is provided with a series of quadrant-shaped plates K, pendently keyed thereon, having flanges K' K², perforated to receive radial arms M, provided with diagonally-set stirrers or scrapers M', which are forced toward the bottom of the trough by spiral springs N in tubular boxes O, secured between the flanges K' K², so that by rocking the shaft J the offal will be disturbed, the moisture of evaporation pass up the flues, and at the same time the offal will be pulverized in the process of drying for use as manure.

I claim as my invention—

In combination with the trough A, provided with inlet-pipe D and outlet-pipe D', and constructed of double walls, the shaft J, carrying a series of quadrant-plates, K, provided with spiral springs N, boxes O, and arms M, having stirrers M', as set forth, for the purpose described.

JOSEPH SPRATT.

Witnesses:
E. M. JOHNSON,
   *Notary Public, B. C.*
J. McMULLEN,
   *Railway Contractor, B. C.*